Aug. 2, 1966 R. J. R. ROUSSE 3,263,624
METHOD AND EQUIPMENT FOR THE LAYING OF RAILROAD TRACKS
Filed April 22, 1963 6 Sheets-Sheet 1
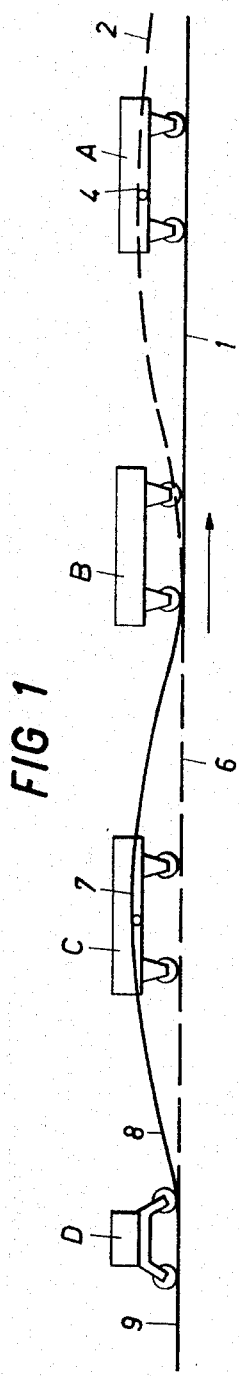
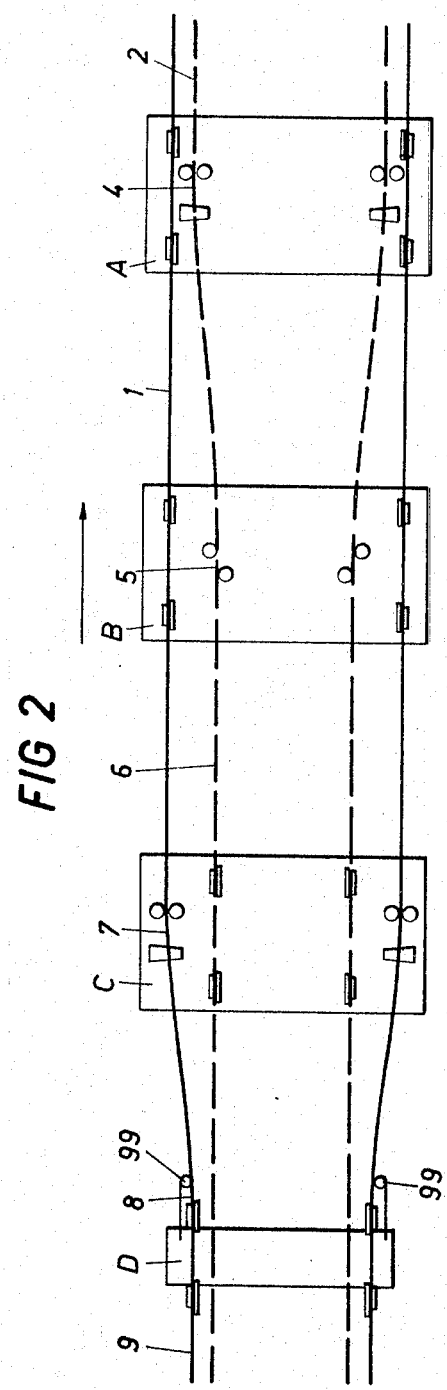
INVENTOR.
ROBERT J. R. ROUSSE
BY Werner W. Kleeman
ATTORNEY

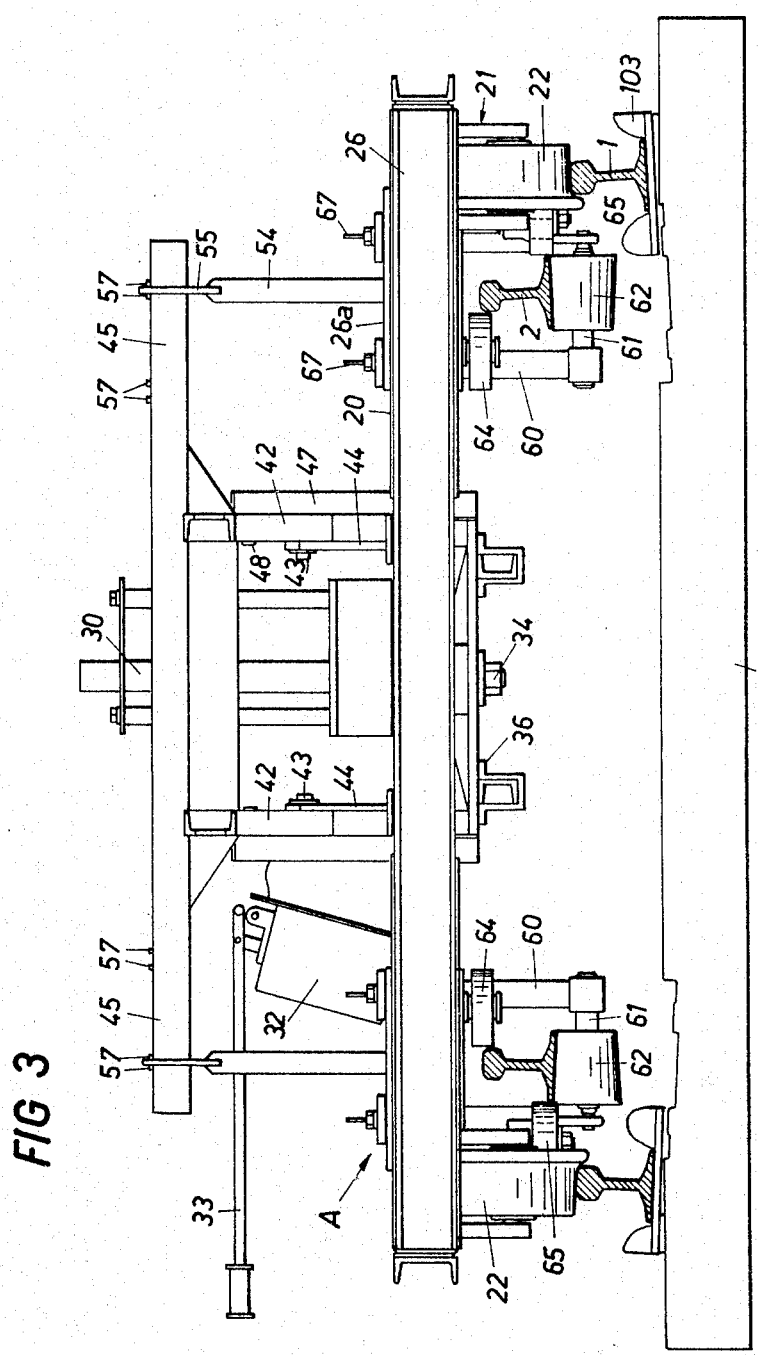

Aug. 2, 1966 R. J. R. ROUSSE 3,263,624
METHOD AND EQUIPMENT FOR THE LAYING OF RAILROAD TRACKS
Filed April 22, 1963 6 Sheets-Sheet 3

INVENTOR.
Robert J. R. Rousse
BY
Werner W. Kleeman
ATTORNEY

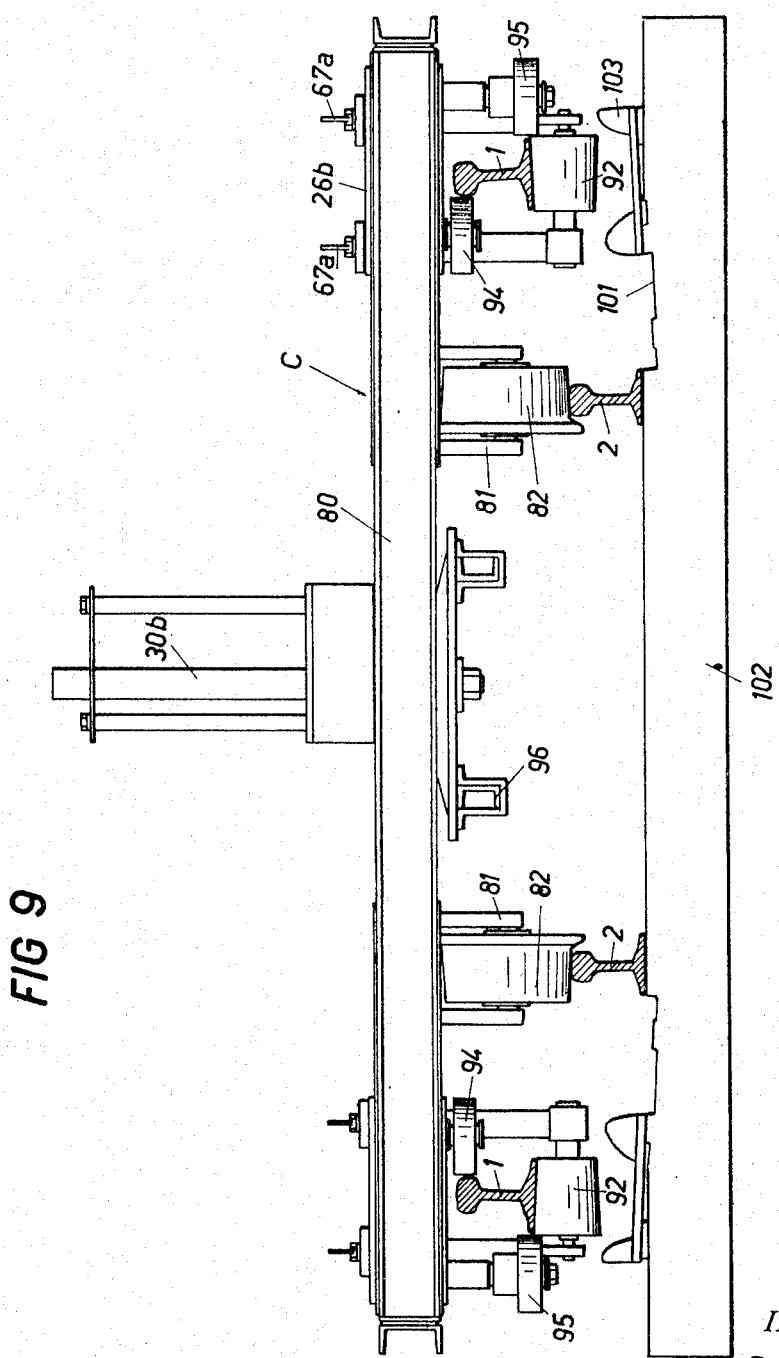

United States Patent Office 3,263,624
Patented August 2, 1966

3,263,624
METHOD AND EQUIPMENT FOR THE LAYING OF RAILROAD TRACKS
Robert Jacques Richard Rousse, Paris, France, assignor to Matisa Materiel Industriel S.A., Lausanne, Switzerland, a corporation of Switzerland
Filed Apr. 22, 1963, Ser. No. 274,664
32 Claims. (Cl. 104—8)

The present invention relates to an improved method and installation for the laying of railroad tracks by substitution of a new track provided with long welded rails in place of an old track.

It is a primary aim of the present invention to quickly and easily substitute the long welded rails in place of the usual short rail lengths, or in place of old long rails, especially in those situations where the sleepers or ties for carrying the final or permanent track exhibit a rail support or seat. The invention is particularly directed at the realization of a relatively simple and convenient installation or equipment for the execution of the aforesaid track substitution.

With the track laying method for which the installation according to the present invention is provided, there is carried out in the course of a first preparatory stage— which follows the laying of the new sleepers or ties for the track to be constructed which are connected to one another by temporary rails, which temporary rails form track sections possessing normal or standard track gauge—a laying of long welded rails at the both ends of the sleepers outside of the temporary track in such a manner that they form a track possessing large track gauge or width. Then, in the course of a second phase or stage, conveniently termed herein the "substitution stage," the temporary rails are lifted from the rail seats of the sleepers and displaced towards the center of the track to form a track of reduced gauge, thereafter the long welded rails are raised and are then displaced towards the center of the sleepers in such a manner that they form the final or permanent track possessing standard track gauge or width. It is to be appreciated that the operational steps of this second or substitution stage are carried out uninterruptedly from one end of the track to the other with time intervals for each point or location of such track taken into consideration.

The present invention further provides improved equipment or installation for the performance of the substitution stage of the aforesaid method, whereby such installation is primarily manifested in the fact that it embodies what has been termed herein as at least three elements or devices. The first element or device is constructed to roll upon a track of large gauge or width and is provided with members or means for raising and supporting the rails of a track of normal or standard gauge. The second element or device, likewise constructed to roll upon a track of large gauge or width, is provided with members or means for laterally guiding these rails and which maintains the aforementioned rails at the reduced track gauge or width. The third element or device constructed to roll upon a track possessing the aforesaid reduced track gauge, is provided with members or means for raising and supporting the rails of the track of large gauge.

These three elements or devices which are advantageously coupled together to provide a train to which there can be coupled a fourth element, the latter of which serves the purpose of checking or controlling the position of the long rails imbeded in the rail seats of the sleepers, permit of carrying out the abovementioned method in a convenient and simple manner requiring a reduced number of workers.

Accordingly, a further important object of the present invention is the provision of an improved method and installation for the laying or renewal of track at a very high rate of output and which can be employed to advantage for the laying of long welded rails.

Another important object of the invention is to provide an improved method and apparatus for the laying of track which is highly efficient, relatively simple and rapid to execute, and allows for a saving in time and labor.

A further important object of the present invention is to provide an improved installation for the laying of tracks for rolling stock and the like embodying at least three elements each of which is especially constructed for carrying out individual prescribed operations required for the performance of the track laying operation.

Still a further important object of the present invention is to provide new and improved individual elements or devices, which individually have improved features, and which collectively provided for an improved installation for laying of track and the like.

Yet a further important object of the present invention is the provision of an installation for the laying of tracks for rolling stock in a reliable, efficient and relatively simple manner, which installation comprises at least three devices or elements, wherein the first of these devices is constructed to roll upon a track of large gauge or width and is provided with means for raising and supporting the rails of a track of standard or normal gauge, the second device is also constructed to roll upon a track of large gauge and is provided with means for laterally guiding the rails of the standard gauge track and for maintaining these rails at a reduced track gauge or width, whereas the third device is constructed to roll upon the track of reduced track gauge and is provided with means for raising and supporting the rails of the track of large gauge.

A further important object of the present invention is to provide a new and useful installation for the laying of tracks for rolling stock and the like including a device constructed to roll upon a track of normal or standard track gauge or width and includes means for checking the position of the rails of such track of standard gauge.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 schematically illustrates a side view of tracks in the process of being exchanged by means of an installation designed according to the teachings of the present invention;

FIGURE 2 is a schematic illustration of the device shown in FIGURE 1 as viewed from the top;

FIGURE 3 is an end view showing details of a preferred embodiment of the first element or device of the installation of the present invention;

FIGURE 9 is a fragmentary front view of an embodiment of the third element or device of the installation according to the present invention;

Figure 4:
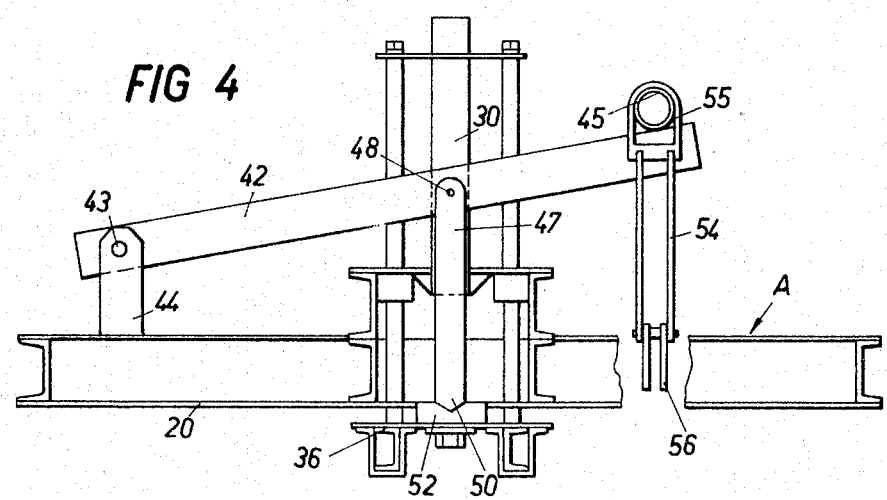
FIGURE 4 is a fragmentary side view of the device shown in FIGURE 3.

Referring now to the drawings and, more particularly, to FIGURES 1 and 2 it will be recognized that such schematically depict the "substitution stage" of the previously described track laying method, wherein these FIGURES 1 and 2 show from the side and top, respectively, the relevant construction site as well as the installation designed according to the invention for carrying out the aforesaid substitution stage. The long welded rails have been represented in these figures by reference numeral 1 and are depicted in full lines. These long welded rails 1 are provided for forming the final or permanent track. The rails of the temporary track have been shown in such figures with broken lines and are denoted by reference numeral 2.

In the course of a preceeding or preparatory stage, after the laying of temporary track sections which may be formed of pre-assembled lengths of temporary rails and for which new sleepers or ties are employed, which rails are connected together with these ties, and as the case may be can also be re-used and are laid with normal or standard track gauge, permanent rail members are laid at both sides externally of these temporary rails and parallel to those welded track sections, which permanent rails rest at the ends of the new ties. These permanent rails provide a runway or rollers track of a larger track gauge than the normal or standard track gauge. These long rails are spacedly guided by special rail chairs or supports secured to the ties or sleepers, and which will be discussed in greater detail hereinafter.

In the course of the substitution stage there exists a first working or operational step which is carried out with the aid of an element or device of the inventive installation, which for convenience in description has been termed the "first device or element" and is generally represented by reference numeral A. This first working step embodies the operation of vertically raising the temporary rail 2 out of the rail seats of the ties, at the location represented by reference numeral 4, whereby such rails rest against guide rollers, to be described fully later, supported by the element or device A which rolls upon the track 1 of large track gauge.

A second working or operation step, carried out with the aid of the so-called "second device or element" B which likewise rolls upon the track 1 of large gauge, embodies the step of horizontally displacing the raised temporary rails 2 towards the center of the track. Such displacement is carried out at location 5 of the second device or element B, as will be fully explained hereinafter, by means of guide rollers carried by said second element in a manner such that the aforesaid temporary rails resting upon the ties form a track 6 of reduced track gauge, or small track gauge, which extends between and parallel to the rails 1 of large track gauge.

During the course of a third working or operational step, carried out with the aid of a so-called "third device or element" C which rolls upon the track of reduced or smaller gauge, there is performed the operation of vertically raising the permanent rails, as generally depicted by reference numeral 7, in order to free such from the special rail chairs or supports and to place them upon guide rollers carried by the element C, as will also be explained in detail shortly. The fourth working or operational step consists of laying the final or permanent rails in the rail seats or supports of the ties or sleepers at the location 8 where such rails again contact the roadbed or surface on the other side of the element C, whereby there results a final or permanent track generally depicted by reference numeral 9.

Advantageously, a "fourth device or element" D whose chassis or wheel frame possesses a normal or standard track gauge, rolls upon such permanent track and checks the position of the permanent rails with the aid of rollers which, as the situation may require, take care of the pushing towards one another of these aforesaid rails.

Referring now in detail to FIGURES 3 to 6 depicting details of the construction of the first device or element A, it will be seen that such is formed from a rectangular frame 20 advantageously assembled from profiled metal beams or supports. In the region of each corner of the frame 20 there is arranged a holder or support 21 for a respective wheel 22, whereby each holder 21 is constructed to slide in a direction parallel to the axis of the associated wheel 22 and vertically to the axis of the track upon which rolls the first device or element A. In the here described embodiment, each holder 21 comprises two parallel plates 23 (FIGURES 5 and 6) which are connected to one another through the agency of the shaft 24 of the associated wheel 22, whereby these plates 23 are arranged between two slide bars or rails 26 formed of two U-shaped profile support members of the longitudinal member of the frame 20. A hand grip or handle 27 which is connected to the holder or support 21 permits displacement of said holder between these slide rails or bars 26 and allows for a change of the wheel gauge of the forward and rearward roller pairs, whereby the holder 21 can be locked in selected position with the help of a movable rod or pin 28 which, on the one hand, traverses said holder by means of a suitable bore and, on the other hand, traverses the slide rails 26, in a manner best shown in FIGURE 5.

The cylinder housing of a piston-cylinder drive generally represented by reference numeral 30 and which is supplied from a suitable pump 32 (FIGURE 3) actuated through the agency of a lever 33, is rigidly connected with the frame 20 at substantially its central or middle region. The piston-cylinder drive 30 includes a vertically arranged piston rod 34 which is secured to a central platform 36, the latter of which can thereby be displaced towards or away from the frame 20. The platform 36 is mounted for rotation about a vertical axis at the end of the piston rod 34, as shown. Due to lowering of this central platform 36 until it comes into contact with the ground or roadbed, then through further extension of the piston-cylinder drive, it is possible to raise the frame 20 from the rails upon which such normally rests, for the purpose to be explained shortly hereinafter.

At both sides of the centrally oriented piston-cylinder drive 30 there are arranged two levers 42 (FIGURES 3 and 4) which are operably articulated or hingedly connected at one respective end with the frame 20 about a common pivot axis parallel to the longitudinal or lengthwise axis of said frame. This common axis can be realized by the provision, for each separate lever 42, of a bolt member 43 which interconnects two uprights or posts 44 secured to the aforesaid frame 20. The respective free ends of the levers 42 are connected to one another through the agency of a metal tube or pipe 45 or the like which is welded or otherwise suitably connected to these levers 42, in a manner best shown in FIGURE 4.

A column member 47 is pivotably connected to each lever 42 at location 48, whereby the lower end of each such column 48 forms a knife edge and rests against a support or bearing surface 52 formed by a portion of the platform 36. In the neighborhood of each end of the metal tube or pipe 45 there is suspended from said tube a lifting arm 54 through the intermediary of a respective stirrup 55 which encompasses the associated end of the tube 45. Each lifting arm 45 terminates at its lower end with a tong or clamp 56 constructed to engage a railhead.

The projections 57 appearing on the tube member 45 fix the position of the stirrup 55 relative to the aforesaid tube member, and they are arranged in such a manner that the spacing between the tongs 56 in the different positions determined by these projections 57 corresponds to the standard or normal and the reduced gauge of the railroad track.

In this arrangement, when the central platform 36 is brought to the level of the underface of the frame 20, the lifting arms 54 are raised and the tongs 56 are located at the height of the frame 20, as illustrated in FIGURE 4. When the platform 36 is lowered the tongs 56 are also simultaneously lowered and can be brought to a suitable height for engaging the rails which are vertically positioned beneath such tongs 56. The frame 20 also carries beneath its underface, in the vertical region beneath each of the lifting arms 54, a vertical arm 60 (see FIGURE 3) which is rotatably mounted to the frame 20 for turning about its longitudinal axis. The lower end of each vertical arm 60 carries a horizontal shaft 61 to which is secured a freely rotatable roller 62, the support or bearing surface of which runs conically towards the associated arm member 60.

The roller member 62 due to pivoting about its associated arm member 60 can essentially assume two operable positions, that is, a support or carrying position in which it is vertically disposed beneath the associated lifting tongs 56 as well as beneath the raised track when such is necessary, and a so-called free or release position in which it completely renders free or unobstructed the space beneath these tongs 56. In this manner, and as will be apparent from subsequent details, it is possible to raise each of the rails through the agency of the lifting arms 54 when the roller 62 is in its free position in order to raise such rails above the level of the bearing surface of the aforesaid roller, then to pivot such roller 62 into its support or carrying position and to then lower the associated rail until it comes into contact with this roller, with simultaneous release of the corresponding tong or clamp 56. The rail 21 is shown in FIGURE 3 in this just described position.

As can further be seen from FIGURE 3, two further rollers 64 and 65 provided with vertically extending axes are arranged beneath the frame 20 and are operably associated with each rail-carrying roller 62. These rollers 64 and 65 are arranged in such a manner that they laterally guide the rail 2 which has been raised in the manner previously described, in that these rollers 64 and 65 correspondingly bear against the railhead and rail flange, respectively, at opposite sides of the rail 2, in the manner clearly shown in FIGURE 3. The rollers 64 and 65 as well as the support for the conical roller 62 are carried by means of a suitable slide or carriage 26a which is laterally displaceable in the frame 20 and the position of which can be selectively locked, as desired, by means of a suitable screw adjustment (not shown). All of the rollers can be pulled upwardly through the aid of vertical guide rods provided with hand grips 67.

Figure 8:
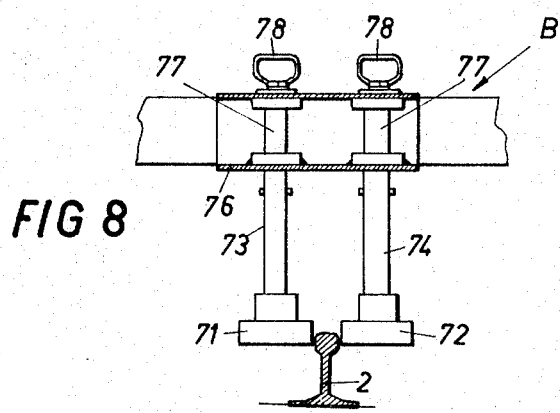
FIGURE 8 is a fragmentary view of a portion of the element or device depicted in FIGURE 7 showing details thereof.
Figure 5:
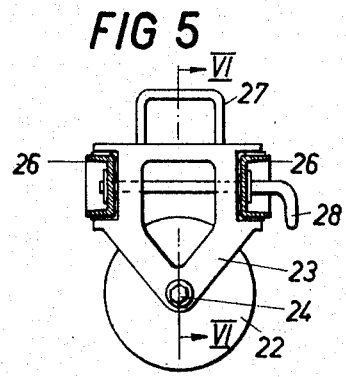
FIGURE 5 illustrates a detail of a portion of the first element depicted in FIGURES 3 and 4.
Figure 6:
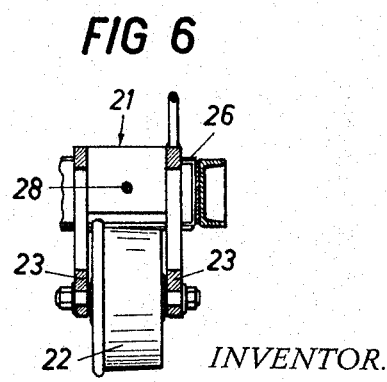
FIGURE 6 is a sectional view taken along the lines VI—VI of FIGURE 5.
Figure 7:
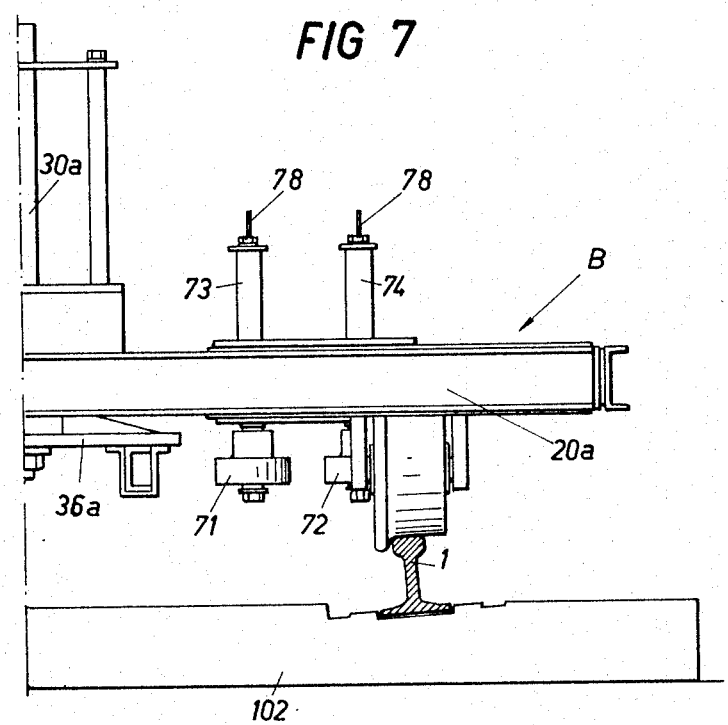
FIGURE 7 is a front view of a portion of the second element or device of the installation according to the present invention, for convenience in illustration only depicting one-half of such device taken from the centerline thereof.

By referring to FIGURES 7 and 8 the details of the second device or element B, now to be described, can readily be ascertained. The second device or element B, which for convenience in illustration only one-half of which is shown in FIGURE 7 is generally more or less similarly constructed as the first device or element A insofar as concerns the frame and the roller members of this last-mentioned element. The frame of the second device or element B likewise supports a central platform 36a corresponding in structure to platform 36, the movement of which is generated by means of a hydraulic cylinder-piston drive, generally represented by reference numeral 30a and in a manner as described in conjunction with the device A. On the other hand, the second device or element B is not provided with the previously described lifting members, that is levers 42 and lifting arms 54 for the rails, as was the case with the device or element A. A further important difference resides in the following described arrangement, manifested in that a pair of roller pairs 71 and 72 having vertical axes are arranged beneath the frame 20a of the element B in the region of its side or lateral marginal edges. These rollers 71 and 72 are appropriately mounted at the ends of the arms 73 and 74 which are displaceably arranged on the frame 20a of element or device B. The rollers 71 and 72 can advantageously be brought to the same height and the distance between the roller surfaces of both said rollers 71, 72 of each roller pair is then somewhat larger than the width of the head of a rail 2 (FIGURE 8).

Each pair of rollers 71 and 72 is mounted, in a manner similar to the rollers 62, 64 and 65, upon a slide or carriage represented in FIGURE 8 by numeral 76. The slide member 76 is constructed to be laterally displaceable through the agency of a suitable adjusting screw (not shown). In this manner, the spacing between the respective pairs of rollers 71, 72 can be adjusted, particularly to a value corresponding to the reduced track gauge or width of the track. Each of the rollers 71 and 72 are also capable of being pulled upwardly with the aid of the vertically arranged guide rods 77 adapted to be displaced by means of the hand grips 78. When such is done the rollers 71 and 72 then assume the position depicted in FIGURE 7.

The third device or element C, which likewise for convenience in illustration has only been partially shown in FIGURE 9, is generally more or less similarly constructed as the device or element A and substantially exhibits corresponding but somewhat differently arranged members. Thus, an inspection of FIGURE 9 will reveal that, the third device or element C is provided with a frame 80 similar to frame 20 of element A, which carries four wheels 82, the holders or supports 81 of which are displaceably mounted on the aforesaid frame 80 in the manner of the holders or supports 21 previously described in conjunction with the description pertaining to device A. The wheel holders 81 in this embodiment can be locked in a position corresponding to the reduced and the normal or standard gauge of the track, respectively. The frame 80 also carries the displaceable carriage means of slide 26b for the groups of rollers 92, 94 and 95 corresponding to the rollers 62, 64 and 65 of the device or element A. Each of the groups of rollers 92, 94 and 95 in this embodiment, however, being arranged externally of the associated wheels 82 in order to be capable of being brought into a vertical position above the rails of a track or large track gauge or width. Hand grips 67a similar to the hand grips 67 of FIGURE 3 are also provided for the rollers 92, 94 and 95.

Finally, the frame member 80 of the device or element C is also provided with a central platform 96 which corresponds to the platform 36 previously described, and which is displaced by means of a cylinder-piston drive, generally denoted by numeral 30b, which can be hand-actuated as previously explained, and which is connected with the non-illustrated levers, arms and lifting tongs, corresponding to the levers 42, arms 54 and tongs 56 of the element A; omitted in FIGURE 9 to provide clarity in illustration. The tongs of the element C are however arranged in such a manner that they can be brought vertically above the rails of the track of large track gauge or width.

Figure 10:
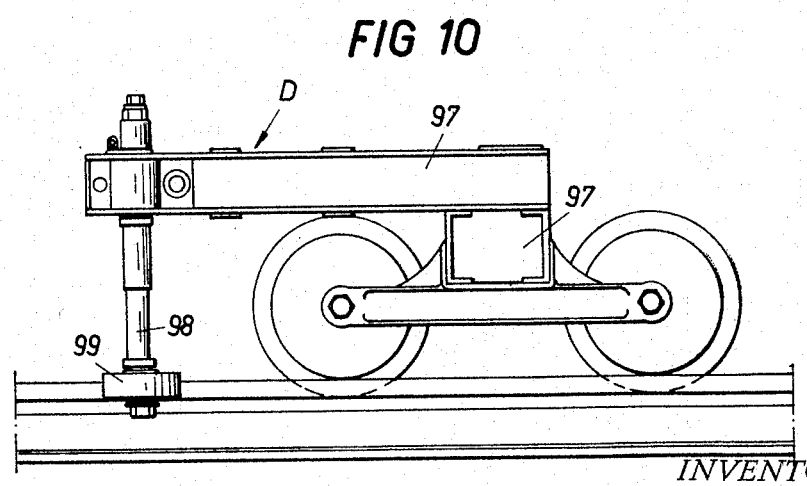
FIGURE 10 is a side view of an embodiment of the fourth element or device of the installation according the the present invention.

The installation according to the present invention, in addition to the three previously described devices or elements A, B and C, can advantageously encompass a fourth device or element D, shown in detail in FIGURE 10, now to be described. The device or element D is formed by a light-weight carriage or cart constructed to roll upon a track of normal track gauge, such as generally represented by carriage 97, at the front side of which two vertical arms 98 are connected serving as supports for two rail-guide rollers 99, only one of which is visible in FIGURE 10. The guide rollers 99 are arranged at the height of the railheads upon which the carriage 97 rests and their respective roller surfaces exhibit a spacing from one another which corresponds to the spacing between the outer surface of one railhead of a normal gauge track and the outer surface of the other railhead of the same track (see FIGURE 2).

Figure 11A:
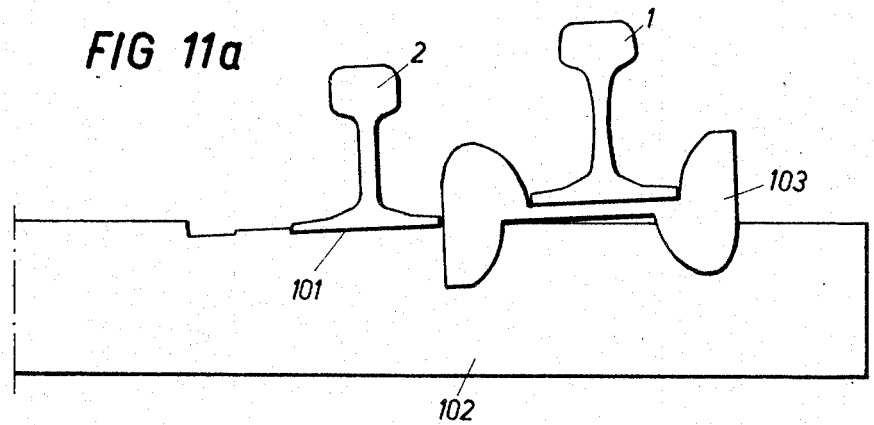
FIGURES 11a, 11b and 11c schematically illustrate the mutual position of the temporary and permanent rails during the course of the different operational steps for track laying carried out with the aid of the installation of the present invention.
Figure 11B:
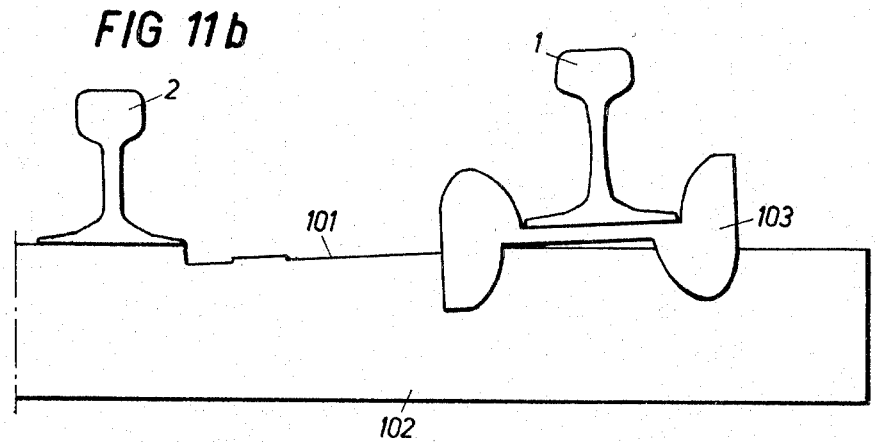
Figure 11C:
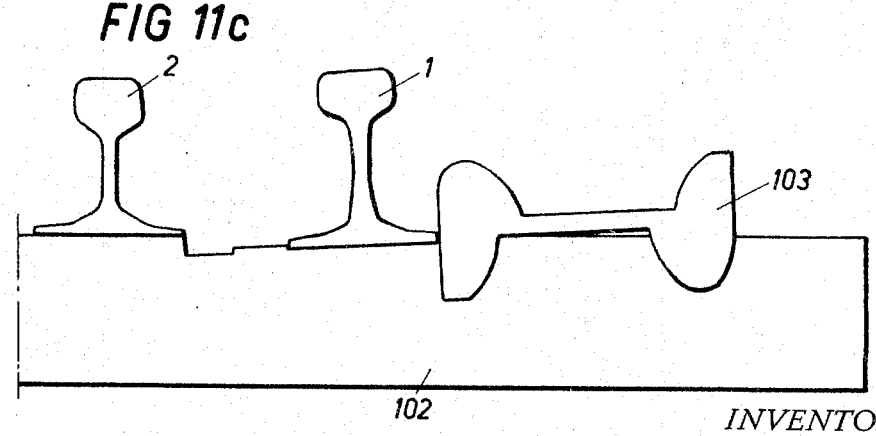

FIGURES 11a, 11b and 11c schematically illustrate the mutual position of the temporary rails 2 and the permanent rails 1 during the course of the various stages of track laying or substitution.

In FIGURE 11a there is illustrated the position of the temporary rail 2 at its location in the rail seat 101 of the tie or sleeper 102 and forms together with the other rail which is symmetrical to it a track of normal or standard gauge (see also FIGURE 2). The rail 1 in long welded sections is arranged externally of the rails 2 of this track and rests on the respective ends of the crossties or ties 102. The rail 1 is spacedly guided in rail chairs or supports 103 which are applied or otherwise seated upon the ties 102 and forms together with its opposed rail a track of large track gauge (see FIGURE 2).

In FIGURE 11b the rail 2 is shown in a position where it has been removed from the rail seat 101 and displaced towards the middle of the crosstie or tie 102, in order to form together with the likewise displaced, opposite cooperating rail a track of reduced track gauge or width. In this figure, the rail 1 has remained in the previously described position, as indicated. In FIGURE 11c the rail 2 has not changed its position, but the rail 1 has been raised out of the rail chairs 103 and has been brought into its final position at the rail seat 101 of the tie 102.

The devices or elements of the installation designed according to the invention, which are coupled together to provide a train and which are pulled by a tractor or the like, are guided to the previously laid standard or normal gauge track at the beginning of the laying or construction site and are separated or uncoupled from one another.

The device or element A is then guided to the junction or transition point of the track which forms the boundary between the previous and the subsequent construction site. This device A is thereafter raised with the aid of the central platform 36 which is operatively fastened or wedged to a tie until the wheels 22 are raised from the rails. The wheels 22 are then laterally displaced until they are disposed vertically above the rails 1 of long welded sections of the outer track of large track gauge or width. The device or element A is then again lowered by retracting the platform 36, so that the wheels 22 now bear against this outer track of large gauge. Then, during such time as the platform 36 is still in its lower position, the ends of the temporary rails 2 are suspended in the rail-lifting tongs or clamps 56. These rails are then raised by means of the cylinder-piston drive 30. The conical rail-carrying rollers 62 are pivoted beneath these temporary rails 2 into their carrying or support position. During such time as the central platform is lowered a small amount the temporary rails are freed or released from the lifting tongs 56, whereupon the central platform 36 is returned into its rest position. The rollers 64 and 65 are lowered into their correct position at both sides of the temporary rail 2. The device or element A and the rails 1 and 2 are thus located in the position illustrated in FIGURE 3.

The device A is displaced a given distance towards the interior of the construction site until the ends of the temporary rails 2 more or less contact the roadbed or surface. Then the device or element B which rolls upon the previously laid permanent track is rolled to the start of the construction site. This element B is then raised with the aid of the central platform 36a and the wheels thereof are displaced from the normal or standard track gauge to the wide track gauge. The element B is then subsequently placed on the track with large track gauge. Directly after this working step, the third device or element C is brought on the normal or standard track to the start of the construction site, raised and adjusted so that its wheels exhibit reduced track gauge or width.

The guide rollers 71 and 72 of the device or element B are then lowered at each side of this device and at both sides of the free end of the corresponding temporary rails 2 (FIGURE 8), and are then laterally displaced towards the middle of the ties 102 in order to bring the ends of the temporary rails 2 to a reduced track gauge. The element B is then conducted towards the interior of the construction site and is coupled together with the element A.

The device or element C which is located vertically above the start of the track of reduced gauge formed of the temporary rails 2 is lowered onto this track. Then the ends of the long welded rails which are to be brought into their final or permanent location are suspended in the lifting tongs of the aforesaid element C. The long rails are then raised in this manner. At the end of a work cycle corresponding to that descibed with respect to the device or element A, and after the extension of the rollers 92, 94 and 95, the device or element C is located in the position shown in FIGURE 9, wherein its wheels rest on the rails 2 of reduced gauge and the rails 1 of welded sections rest upon the rail-carrying rollers 92. The element C is then coupled to both of the previous elements B and A and the thus formed train is pulled towards the interior of the construction site. The free ends of the rails 1 are manually displaced towards the center of the track and brought into alignment with the ends of the permanent track of the previous laying or construction site.

The device or element D which has been brought up on the previous laid track is applied to the rails 1 of the track under construction, whereby the position of these rails are checked by the guide rollers 99 of this last-mentioned element D. The element D is then coupled to the other elements. In order to remove the individual elements of the installation from the construction site, the previously described working steps are executed in reverse sequence, so that the entire installation at the end of these working steps are located on a track of normal or standard gauge and can then be rolled to a suitable storage location.

It is to be mentioned that in the event that the storage location is too far removed from the construction site, it is possible to raise each of the devices or elements A, B and C with the aid of its corresponding central platform 30, 30a and 30b, respectively, in order to raise the wheels thereof from the rails and to then pivot such respective element through 90 degrees on its associated platform. It will be recalled, and as previously described, each of these platforms are rotatably secured at the end of their associated piston rod. The appropriate element or device is then lowered so that its wheels can come to rest on track sections which are laid perpendicular to the standard or normal track and which permit the aforesaid element to be brought to a temporary storage location adjacent the track. It is to be appreciated that in the preparatory phase of the process of track laying or substitution there can be employed pre-assembled lengths made up with temporary rails advantageously supported on new ties at a normal or standard track gauge which are then transported to the laying or construction site and are subsequently replaced by the permanent rails. It is also conceivable to work with the old rails of the track to be renewed or laid, after advantageously replacing the old ties with new ones, which old rails are then subsequently replaced by the permanent rails.

It is of course to be appreciated that the invention is not limited to the embodiments previously described and which have only been given by way of illustration and not limitation, as it will be apparent that numerous changes and variations thereof are readily possible and will suggest themselves to those skilled in the art without departing from the spirit and scope of the invention.

Having thus described the present invention, what is desired to be secured by United States Letters Patent, is:

1. A method of laying rails, particularly long welded rails, by substituting permanent rails for temporary rails arranged at a normal track gauge, comprising the steps of: laying permanent rails at both of the ends of the crossties of the temporary rails of normal track gauge, with the permanent rails disposed to provide a larger truck gauge than said normal track gauge, then lifting the temporary rails from their crossties, displacing the temporary rails towards the center of the track and finally again lowering such temporary rails onto said crossties to form a track of reduced gauge with respect to said normal track gauge, thereafter raising the permanent rails and displacing them inwardly towards the center of the track and lowering such permanent rails onto the crossties to form a track of permanent rails possessing normal track gauge.

2. A method of laying rails, particularly long welded rails, by substituting permanent rails for temporary rails arranged at a normal track gauge, comprising the steps of: laying permanent rails at both of the ends of the crossties of the temporary rails of normal track gauge, with the permanent rails positioned to provide a larger track gauge than said normal track gauge, then lifting the temporary rails from the rail seats of their crossties, displacing these lifted temporary rails toward the center of the track and finally again lowering such temporary rails onto said crossties to form a track of reduced gauge with respect to said normal track gauge, thereafter raising the permanent rails and displacing them inwardly towards the center of the track and lowering such permanent rails onto the crossties and into the seats of the crossties previously occupied by the temporary rails to form a track of permanent rails possessing normal track gauge.

3. A method for the laying or renewal of rails, particularly for laying long welded rails, by substituting permanent rails for temporary rails arranged at a normal track gauge comprising the steps of: laying permanent rails adjacent both of the ends of the crossties of the temporary rails of normal track gauge in rail chairs carried by the crossties, with the permanent rails arranged to provide a larger track gauge than said normal track gauge, then lifting the temporary rails from the rail seats of their crossties, displacing these lifted temporary rails toward the center of the track and finally again lowering such temporary rails onto said crossties to form a track of reduced gauge with respect to said normal track gauge, thereafter raising the permanent rails from their rail chairs and displacing them inwardly towards the center of the track and lowering such permanent rails onto the crossties and into the seats of the crossties previously occupied by the temporary rails to form a track of permanent rails possessing normal track gauge, then checking and aligning the thus positioned permanent rails to make certain they possess normal track gauge, and finally removing the temporary rails.

4. A method for the laying or renewal of rails, particularly for the laying of long welded rails, by substituting permanent rails for temporary rails arranged at a normal track gauge, comprising the steps of: laying permanent rails at both of the ends of the crossties of the temporary rails of normal track gauge, with the permanent rails located to provide a larger track gauge than said normal track gauge, next applying a lifting device onto the permanent rails and lifting the temporary rails from their crossties, then directing a rail-positioning device onto the permanent rails and displacing the lifted temporary rails toward the center of the track, and finally again lowering such temporary rails onto said crossties to form a track of reduced gauge with respect to said normal track gauge, and applying a further lifting device onto the temporary rails for movement therealong and engaging the permanent rails by said further lifting device to displace such permanent rails towards the center of the track, then lowering such permanent rails onto the crossties to form a track of permanent rails possessing normal track gauge.

5. Installation for the laying of rails with normal track gauge including at least a first, second and third device, said first device comprising a frame member, means providing movement for said frame member along rails of larger track gauge than said normal track gauge of the rails to be laid; said second device comprising a frame member, means providing movement for said last-mentioned frame member along said rails of larger than normal track gauge; said third device comprising a frame member, means providing movement for said last-mentioned frame member along rail members of reduced track gauge with respect to the normal track gauge of the rails to be laid.

6. Installation for the laying of rails as defined in claim 5; including a fourth device comprising a frame member, means providing movement for said last-mentioned frame member along rails of normal track gauge and further including means for checking the position of said rails of normal track gauge.

7. Installation for the laying of rails as defined in claim 6; wherein said checking means comprises a pair of guide roller members mounted in spaced relation to said frame member of said fourth device at a distance substantially corresponding to the normal track gauge adapted to contact the laid rails to align the latter at said normal track gauge.

8. Installation for the laying of rails as defined in claim 5; wherein said means providing movement for each of said first, second and third devices comprises wheel means, slidable housing means cooperating with each of said wheel means to alter the wheel gauge thereof for accommodation of each said device to the track gauge of the associated rails upon which said wheel means are to travel.

9. Installation for the laying of rails as defined in claim 8; wherein said slidable housing means for said first and second device are displaceably arranged on the associated frame member thereof for shifting of said wheel means from a normal track gauge to the larger track gauge, said slidable housing means for said wheel means of said third device being displaceably arranged on the associated frame member thereof for shifting of said wheel means thereof from a normal track gauge to the reduced track gauge.

10. Installation for the laying of rails as defined in claim 5; wherein said first, second and third device each include a platform member mounted for movement in a vertical direction relative to the associated frame member, and drive means provided for each said platform member to drive the latter in said vertical direction towards and away from said associated frame member.

11. Installation for the laying of rails as defined in claim 10; wherein each said platform member is operatively connected to the provided drive means therefor for rotation about a vertical axis and relative to the associated frame member, said drive means of each first, second and third device being adapted to raise its associated frame member from rails upon which such frame member rides by lowering of its associated platform member, whereby the corresponding device can be rotated through a given angle to permit removal thereof laterally of said rails upon which such device rides.

12. Installation for the laying of rails as defined in claim 10; wherein said drive means for each platform member comprises a hydraulic piston-cylinder drive.

13. Installation for the laying of rails as defined in claim 5; wherein said first and third device each include rail lifting means, said rail lifting means of said first device being positioned to lift rails possessing normal track gauge and said rail lifting means of said third device being positioned to lift rails possessing said larger track gauge.

14. Installation for the laying of rails as defined in claim 13; wherein said rail lifting means for said first and third device each include a pair of rail-lifting tongs mounted for vertical displacement between a lower and upper position.

15. Installation for the laying of rails as defined in claim 14; wherein said first and third device each include a platform member supported for vertical movement relative to its associated frame member, drive means for displacing each of said platform members, said rail lifting means for said first and third device further including lever means operable with said drive means for the associated platform member thereof for displacing said pair of tongs thereof in dependence upon the position of said associated platform member relative to its frame member.

16. Installation for the laying of rails as defined in claim 15; wherein said first and third device further include rail supporting means for carrying the rails lifted by the respective rail lifting means of said first and third device.

17. Installation for the laying of rails as defined in claim 16; wherein said rail supporting means include a separate rail carrying roller member disposed beneath each rail-lifting tong, and means operably connected to each rail carrying roller member for displacing the latter into one of two positions, one position of which locates said rail carrying roller member beneath its associated tong for carrying a rail lifted by such tong, and the other position of which provides an unobstructed path of travel for said associated tong for movement into its rail-lifting position.

18. Installation for the laying of rails as defined in claim 17; said rail supporting means further including a pair of cooperating guide rollers for each rail carrying roller member disposed to laterally guide a rail at opposite sides thereof and which is carried by the associated rail carrying roller member.

19. Installation for the laying of rails as defined in claim 18; said rail supporting means further including slide means for each rail carrying roller member and its pair of cooperating guide rollers for horizontally shifting all such rollers to laterally displace a rail when engaged by said rail supporting means.

20. Installation for the laying of rails as defined in claim 19; wherein each rail supporting means further includes handle means for vertically displacing said pair of cooperating guide rollers.

21. Installation for the laying of rails as defined in claim 16; wherein said rail supporting means of said first device are disposed adjacent the inner side of said movement providing means beneath the associated rail lifting means thereof, and said rail supporting means of said third device being disposed externally of its movement providing means beneath the associated rail lifting thereof.

22. Installation for the laying of rails as defined in claim 5; said second device including two pairs of cooperating guide rollers, each pair of cooperating guide rollers including roller members spaced at a distance from one another substantially corresponding to the width of a railhead to be engaged, and means operatively connected with each pair of cooperating guide rollers for lateral shifting thereof to adjust the spacing between said pairs of cooperating guide rollers.

23. Installation for the laying of rails as defined in claim 22; wherein said operatively connected means for each pair of cooperating guide rollers further includes means permitting vertical displacement of the latter.

24. Installation for the laying of rails with predetermined track gauge defined as a normal track gauge including at least a first, second and third device, said first device comprising a frame member, wheel means carried by said frame member adapted to travel along rails of larger track gauge than said normal track gauge, holder means mounted for sliding movement to said frame member provided for said wheel means for shifting said wheel means between a normal track gauge and a larger than normal track gauge, a platform member operatively connected to the underface of said frame member, drive means for displacing said platform member towards and away from said frame member, rail lifting means operatively connected with said drive means, and rail support means disposed beneath said rail lifting means; said second device comprising a frame member, wheel means carried by said last-mentioned frame member adapted to travel along rails of larger track gauge than said normal track gauge, holder means for said last-mentioned wheel means mounted for sliding movement to said last-mentioned frame member for shifting of such wheel means between said normal track gauge and said larger than normal track gauge, a platform member operatively connected to the underface of said last-mentioned frame member, drive means for displacing said last-mentioned platform member towards and away from its frame member, guide roller means displaceably supported by said last-mentioned frame member adapted to engage a railhead, and means cooperating with said guide roller means for horizontal shifting thereof relative to said last-mentioned frame member; said third device comprising a frame member, wheel means carried by said last-mentioned frame member adapted to travel along rails of smaller track gauge than said normal track gauge, holder means mounted for sliding movement to said last-mentioned frame member provided for said last-mentioned wheel means for shifting the latter between a normal track gauge and the smaller track gauge, a platform member operatively connected to the underface of said last-mentioned frame member, drive means for displacing said last-mentioned platform member towards and away from its associated frame member, rail lifting means operatively communicating with said last-mentioned drive means, and rail support means disposed beneath said last-mentioned rail lifting means.

25. Installation for the laying of rails according to claim 24; including a fourth device comprising a frame member, wheel means for said last-mentioned frame member to permit movement thereof along rails of normal track gauge, and further including roller means for checking and aligning the position of said rails of normal track gauge.

26. A device employed for the laying of rails at a predetermined track gauge defined as a normal track gauge comprising, in combination; a frame member, wheel means adapted to travel upon rails, said wheel means being rotatably supported by said frame member, holder means for said wheel means slidably carried by said frame member for adjusting said wheel means for travel along rails of different track gauge, a platform member mounted to be vertically displaceable relative to said frame member, drive means for displacing said platform member into an extended position to lift said wheel means away from the rails upon which the latter travel, rail lifting means operatively communicating with said drive means for said platform member and operably responsive to the position of said platform member, and rail supporting means operable with said rail lifting means.

27. A device according to claim 26; wherein said holder means permit displacement of said wheel means for travel upon rails of normal track gauge and larger than normal track gauge, said rail lifting means including tong members mounted to lift rails positioned at normal track gauge.

28. A device according to claim 27; wherein said rail supporting means are disposed inwardly of said wheel means and beneath said tong members, said rail supporting means including roller members and means for shifting said roller members into a position whereby said tong members are free to move into engagement with rails to be lifted.

29. A device according to claim 26; wherein said holder means permit displacement of said wheel means for travel upon rails of normal track gauge and smaller than normal track gauge, said rail lifting means including tong members mounted to lift rails positioned at larger than normal track gauge.

30. A device according to claim 29; wherein said rail supporting means are disposed exteriorly of said wheel means and beneath said tong members, said rail supporting means including roller members and means for shifting said roller members into a position whereby said tong members are free to move into engagement with rails to be lifted.

31. A device employed for the laying of rails at a predetermined track gauge defined as a normal track gauge comprising, in combination; a frame member, wheel means adapted to travel upon rails, said wheel means being rotatably supported by said frame member, holder means for said wheel means slidably carried by said frame member for adjusting said wheel means for travel along rails of normal track gauge and larger than normal track gauge, respectively, a platform member mounted to be vertically displaceable relative to said frame member, drive means for displacing said platform member into an extended position to lift said wheel means away from the rails upon which the latter travel, and a first and second pair of cooperating roller means movably supported by said frame member, each pair of cooperating roller means including a pair of roller members spaced at a distance substantially corresponding to the width of a railhead to be engaged by each pair of cooperating roller means, and means operatively connected with said first and second pair of roller means to shift said pairs of roller means from a spacing corresponding to the normal track gauge to a spacing smaller than said normal track gauge and vice versa.

32. A device employed in the laying of rails at a predetermined track gauge defined as a normal track gauge comprising, in combination; a frame member, wheel means adapted to travel upon rails positioned at normal track gauge rotatably supported by said frame member, means for checking the position of the rails positioned at normal track gauge and for aligning such rails at said normal track gauge when out of alignment, said checking and aligning means including a pair of roller members spaced from one another a distance substantially corresponding to said normal track gauge and adapted to contact the outermost face of respective oppositely arranged cooperating rails of normal track gauge when said device travels along such rails.

References Cited by the Examiner

UNITED STATES PATENTS 1,941,930  1/1934  Collet et al. _____ 104—2 X

OTHER REFERENCES

Schemitzeck et al., German Application, 1,088,079, printed September 1, 1960. Ke 19a. 27/01.

ARTHUR L. LA POINT, *Primary Examiner.*

LEO QUACKENBUSH, *Examiner.*

M. J. HILL, R. A. BERTSCH, *Assistant Examiners.*